Figure 3:
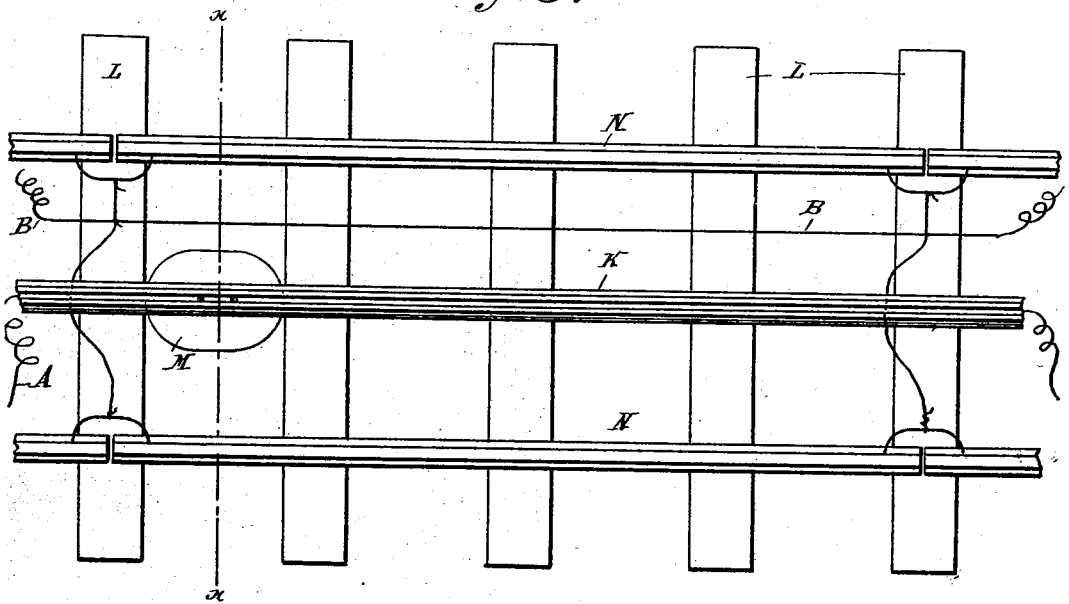

(No Model.)　　　　　　　　　　　　　　　　　　　　2 Sheets—Sheet 1.
A. J. ROBERTSON.
CONDUIT FOR ELECTRIC RAILWAYS.
No. 508,578.　　　　　　　　　　　Patented Nov. 14, 1893.
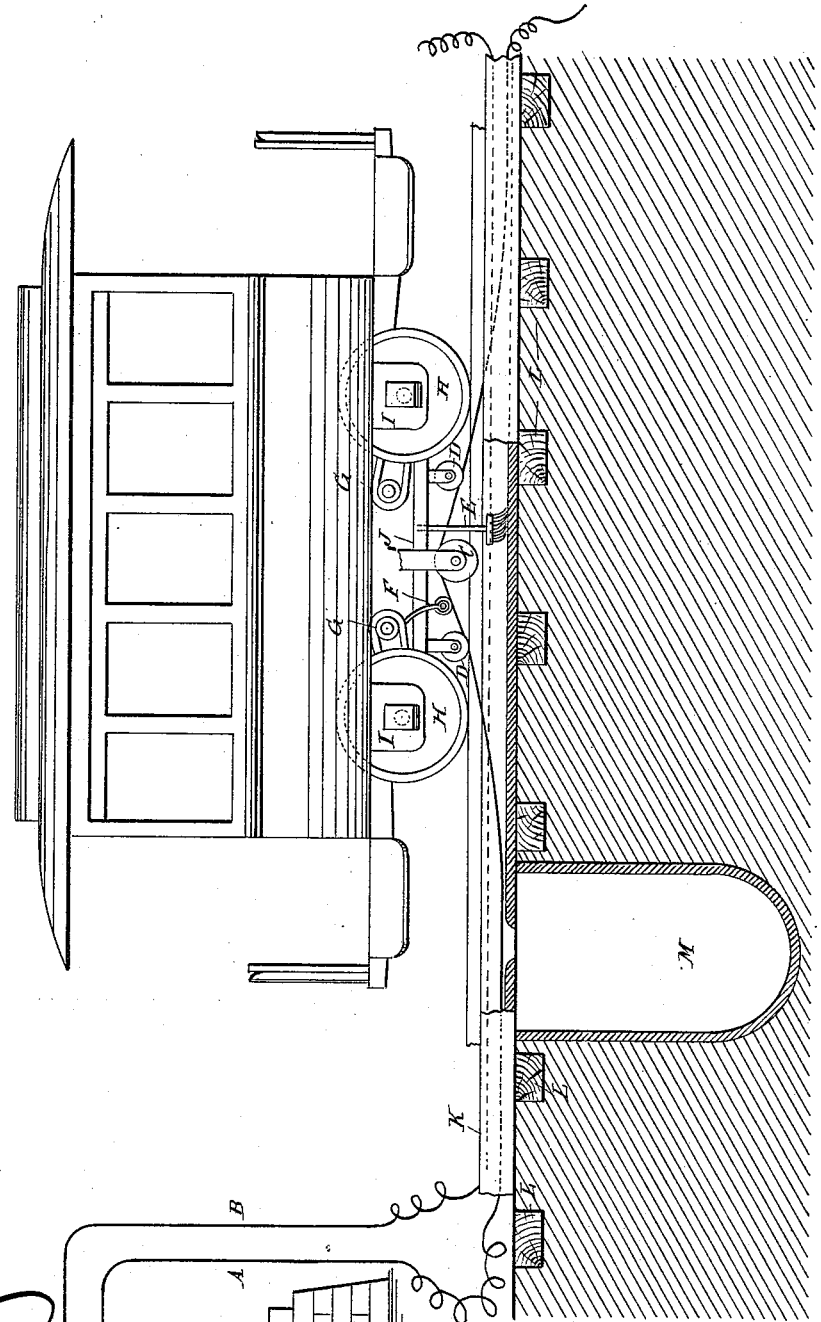
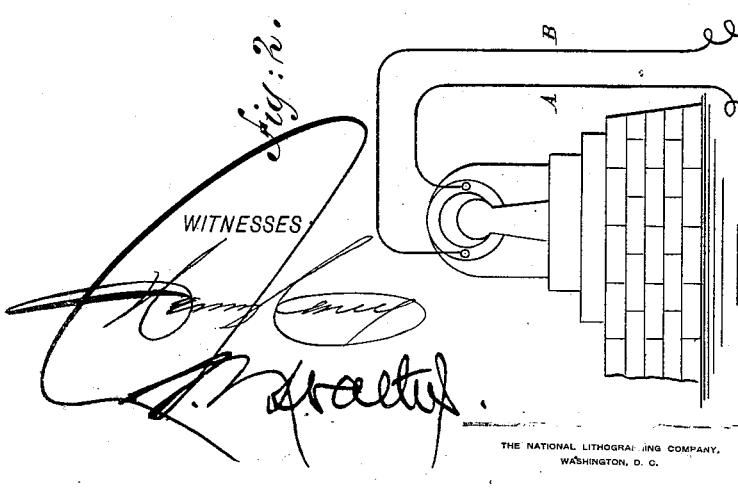
WITNESSES
INVENTOR:
Archibald J. Robertson
THE NATIONAL LITHOGRAPHING COMPANY,
WASHINGTON, D. C.

(No Model.) 2 Sheets—Sheet 2.

A. J. ROBERTSON.
CONDUIT FOR ELECTRIC RAILWAYS.

No. 508,578. Patented Nov. 14, 1893.

WITNESSES: INVENTOR:

Archibald J. Robertson

UNITED STATES PATENT OFFICE.

ARCHIBALD J. ROBERTSON, OF NEW YORK, ASSIGNOR TO HIMSELF, GEORGE S. BRUSH, OF BROOKLYN, AND HENRY CAREY, OF ELM PARK, NEW YORK.

CONDUIT FOR ELECTRIC RAILWAYS.

SPECIFICATION forming part of Letters Patent No. 508,578, dated November 14, 1893.

Application filed January 6, 1891. Renewed April 4, 1893. Serial No. 468,961. (No model.)

*To all whom it may concern:*

Be it known that I, ARCHIBALD J. ROBERTSON, a subject of the Queen of Great Britain, and a resident of the city, county, and State of New York, have invented certain Improvements in Conduits or Receptacles for the Main Conductors of Electric Railways, of which the following is a specification.

My invention relates in the main to conduits or receptacles for the main conductors of that class of electrical railways described in my Patent No. 462,672, dated November 3, 1891, wherein a naked main conductor lies in a slitted or open conduit—having its inner surface composed of, or covered with, insulating material—the electrical connection with the motor on the car being maintained by supporting the slack conductor on a carrier pulley, insulated and pendent from the car.

The object of my invention is to provide such a conduit with a basin or receiver for the reception of drainage water from the conduit, and to so construct said conduit and basin that the water collected and incarcerated therein shall be insulated and earth leakage of electricity from the conductor prevented. This object I effect in a general way by providing the basin with an inner lining or surface of insulating material and making this insulating lining continuous with that of the conduit throughout its entire extent. There may be any desired number of these basins and they may be of any desired capacity. The inner surface of the conduit and basin may be coated or covered with any suitable insulating material, as porcelain or glass, for example, or the conduit and basin may be constructed wholly of insulating material. It is only essential that the inner surface thereof shall be continuously insulated in such a manner that water which enters the open conduit and drains thence into the basin or receiver shall have no electrical connection with the earth. The conduits and basins will be water tight, of course, as well as insulated, and the earth contact being completely cut off there can be no leakage of the electric current even though the water fills the reservoir and rises in the conduit to an extent sufficient to submerge the wire or main conductor therein. Under these circumstances the wire will be surrounded by an excellent electrical conductor water, which will become charged with electricity and being held in an insulated inclosure the escape of its electrical load becomes impossible. The water collected in the basin or receiver as well as the accumulated dirt and sediment may be removed at an opening in its top.

Figure 4:
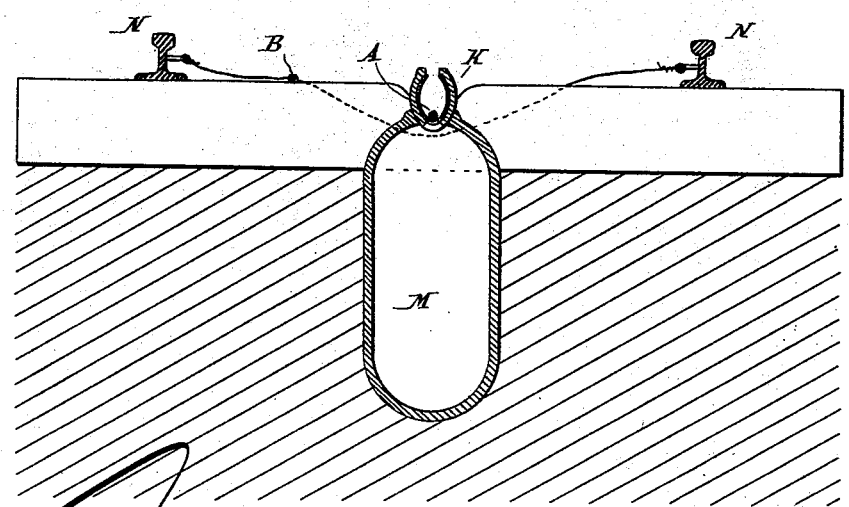

In the drawings which serve to illustrate my invention Figure 1 is a side elevation showing my improvement applied to an electric railway, similar to that in my Patent No. 462,672. Fig. 2 is the generator from which the main conductor extends through the conduit. Fig. 3 is a plan of a part of the railway track, showing the ties, rails and underground return conductor, attached to the copper tie wire which is united to each rail and making a perfect electrical connection. Fig. 4 is a transverse section of the track showing the conduit, basins, ties, &c.

"A" is the main naked conductor wire which rests in and extends along the insulated conduit. "B" is the return conductor wire. "C" is the carrier pulley for the main conductor. "D D" are the guide pulleys for the main conductor. "E" is the brush which sweeps the conduit. "F" is the trolley and "G" is the motor on the car. These are all arranged substantially as represented in my patent before referred to and are only employed here to illustrate the application of my invention.

"K" is the conduit for the main conductor "A" as herein shown. This conduit is arranged about midway between the track rails "N." It will be open at the top and provided with an inner surface or lining of insulating material as above described.

"M" is the basin or reservoir to receive the dirt and drainage from the conduit "K." This basin will have an opening in its top coinciding with an opening in the bottom of the conduit and it will have an insulating lining or inner surface which should be continuous with that of the conduit so that there may be no leakage of electricity at the joint or point wherein they connect the one with the other.

These basins may be arranged at any distance apart desired along the track.

Having thus described my invention, I claim—

1. A conduit or receptacle for a naked electric wire, having storage capacity for water, and having an inner surface of insulating material whereby the water that may collect therein will be electrically insulated from the earth.

2. An open conduit for a naked electrical conductor having a basin or receiver connected with it to receive the drainage from the conduit—said conduit and basin having inner surfaces of insulating material in the form of a continuous lining, whereby the water which collects in said basin will be electrically insulated from the earth.

ARCHIBALD J. ROBERTSON.

Witnesses:
HENRY CAREY,
J. N. WALTER.